United States Patent Office 3,752,890
Patented Aug. 14, 1973

3,752,890
N-(1-AZIDO-2,2,2-TRIHALOETHYL)AZIDES AND CARBAMATES AS NEMATOCIDES
Malcolm S. Singer, Richmond, Calif., assignor to Chevron Research Company, San Francisco, Calif.
No Drawing. Original application Jan. 7, 1969, Ser. No. 789,595, now Patent No. 3,636,062. Divided and this application June 28, 1971, Ser. No. 163,522
Int. Cl. A01n 9/20
U.S. Cl. 424—226    10 Claims

ABSTRACT OF THE DISCLOSURE
Azides of the formula $$R-NH-\overset{N_3}{\underset{|}{C}H}-CX_3$$

in which X is Cl or Br and R is a carboxyacyl, sulfonylacyl or alkoxycarbonyl group. These azides are nematocidal.

CROSS REFERENCE TO RELATED APPLICATIONS

This application is a division of copending application Ser. No. 789,595, filed Jan. 7, 1969 now U.S. Pat. No. 3,636,062.

FIELD OF INVENTION

This invention concerns N-(1-azido-2,2,2-trihaloethyl) amides and carbamates and their use as nematocides.

INVENTION DESCRIPTION

The novel azides of this invention are carbamates, carboxamides and sulfonamides. These azides are of the formula $$R-NH-\overset{N_3}{\underset{|}{C}H}-CX_3$$

wherein X is halogen of atomic number 17 to 35 and R is (a)
$$R'-\overset{Z}{\underset{|}{C}}-$$

wherein Z is a chalcogen atom of atomic number 8 to 16 and R' is hydrogen, nonarylhydrocarbyl of 1 to 10 carbon atoms which is free of acetylenic unsaturation, nonarylhalohydrocarbyl which is free of acetylenic unsaturation and of 1 to 10 carbon atoms and 1 to 3 halogen atoms of atomic number 17 to 35, monocarbocyclicaryl of 6 to 15 carbon atoms, the benzene nucleus of said monocarbocyclicaryl radical being substituted with 0 to 3 alkoxy groups of 1 to 3 carbon atoms, each, halogens of atomic number 17 to 35 or nitro groups, alkoxy of 1 to 6 carbon atoms, phenylthioalkyl in which the alkyl is of 1 to 3 carbon atoms and the phenyl is substituted with 0 to 2 halogen atoms of atomic number 17 to 35, phenylsulfonylalkyl in which the alkyl is of 1 to 3 carbon atoms and the phenyl is substituted with 0 to 2 halogen atoms of atomic number 17 to 35, or a 5-membered heterocyclic radical of 4 nuclear carbon atoms, one of which is bound to the carbonyl radical of (a), and a single chalcogen heteroatom of atomic number 8 to 16, or (b)    $R^2SO_2$— wherein $R^2$ is a nonarylhydrocarbyl radical of 1 to 6 carbon atoms which is free of acetylenic unsaturation and is substituted with 0 to 2 halogen atoms of atomic number 17 to 35 or a monocarbocyclicaryl radical of 6 to 10 carbon atoms in which the benzene nucleus is substituted with 0 to 2 halogens of atomic number 17 to 35, nitro groups or methoxy groups. Halogens of atomic number 17 to 35 are chlorine and bromine. Chalcogen atoms of atomic number 8 to 16 are oxygen and sulfur. The term "nonaryl" as used herein refers to radicals in which a benzene nucleus is not present. Preferably X is chlorine and Z is oxygen in the above formulas.

Particularly preferred compounds represented by the above formula are those in which X is chlorine, Z is oxygen, R' is hydrogen, alkyl of 1 to 6 carbon atoms, alkoxy of 1 to 3 carbon atoms, monoalkenyl of 2 to 5 carbon atoms, cycloalkyl of 3 to 6 carbon atoms, monocarbocyclicaryl of 6 to 10 carbon atoms in which the benzene nucleus is substituted with 0 to 3 chlorine atoms, nitro groups or alkoxy groups of 1 to 2 carbon atoms each, chloroalkyl of 1 to 6 carbon atoms and 1 to 3 chlorine atoms, phenylthiomethyl in which the phenyl group is substituted with 0 to 2 chlorine atoms or phenylsulfonylmethyl wherein the phenyl group is substituted with 0 to 2 chlorine atoms and $R^2$ is alkyl of 1 to 6 carbon atoms or phenyl substituted with 0 to 2 chlorine atoms.

Hydrocarbyl radicals which R' represents in the above formula include alkyl, alkenyl, cycloalkyl and cycloalkenyl radicals. Specific examples of such radicals are methyl, ethyl, isopropyl, butyl, hexyl, heptyl, nonyl, decyl, vinyl propenyl, butenyl, pentenyl, octenyl, decenyl, cyclopropyl, cyclobutyl, cyclohexyl, cyclooctyl, cyclohexenyl and cyclooctenyl. Corresponding halohydrocarbyl groups represented by R' include chloromethyl, bromomethyl, 2,2-dichloroethyl, 3-bromo-2-chloropropyl, 2-bromoethyl, 5-chloro-2-pentenyl, 6-chlorohexyl, 9-bromodecyl, 4-bromocyclohexyl, 2,4,6-tribromocyclohexyl, 2-chlorocyclohexenyl and 3-chlorocyclobutyl.

Examples of monocarbocyclic aryl radicals which R' may represent are phenyl, tolyl, xylyl, cumyl, p-butylphenyl, p-octylphenyl, 2,4-dibutylphenyl, cinnamyl, benzyl, p-methoxyphenyl, 2-methoxy-4-tolyl, 2,4,6-tripropoxyphenyl, 2,4,6-trinitrophenyl, 3,5-dibromophenyl, 2-chloro-4-methoxyphenyl, 2-bromo-4-tolyl, 2-chloro-4-ethylphenyl, 2,4,6-tribromophenyl, 2,4-diethoxybenzyl, 2,4 - dinitrophenyl, 2-chloro-5-nitrophenyl and 5-nitro-2-tolyl.

Alkoxy radicals which R' may represent include methoxy, ethoxy, isopropoxy, butoxy, isopentoxy and hexoxy.

Heterocyclic radicals which R' may represent include 2-furyl, 4-furyl, 5-nitro-2-furyl, 5-chloro-2-furyl, 4-bromo-2-furyl, 3-thienyl, 5-nitro-2-thienyl, 4-chloro-2-thienyl, 5-bromo-3-thienyl and 2-thienyl.

Phenylthioalkyl groups represented by R' are illustrated by phenylthiomethyl, phenylthioethyl, phenylthioisopropyl, 4-chlorophenylthioethyl, 2-chlorophenylthiopropyl, 3,5-dibromophenylthioethyl, 2,4-dichlorophenylthiomethyl and 2-chloro-4-bromophenylthiopropyl.

Phenylsulfonylalkyl radicals represented by R' include phenylsulfonylmethyl, phenylsulfonylethyl, phenylsulfonylisopropyl, 4 - chlorophenylsulfonylethyl, 2-chlorophenylsulfonylpropyl, 3,5 - dibromophenylsulfonylethyl, 2,4 - dichlorophenylsulfonylmethyl and 2 - chloro - 4-bromophenylsulfonylpropyl.

Nonarylhydrocarbyl radicals which $R^2$ may represent include alkyl, alkenyl and cycloalkyl. Examples of such radicals are methyl, ethyl, propyl, amyl, hexyl, allyl, pentenyl, 2,2-dibromoethyl, chloroallyl, bromobutenyl, cyclopropyl, cyclobutyl, cyclohexyl, 4 - chlorocyclohexyl, 2 - bromocyclohexyl, 3,5 - dichlorocyclohexyl, 3-bromocyclobutyl, chloromethyl, bromoethyl, 2,2 - dichloropropyl and 6-chlorohexyl. Aryl radicals represented by $R^2$ include benzyl, phenyl, tolyl, xylyl, cumyl, 2,4-dinitrophenyl, 3,5 - dimethoxyphenyl, 4 - chlorobenzyl, 2-bromo-4-tolyl, 2-methoxyphenyl, 4-chlorophenyl, 2-bromophenyl, 4-bromo-2-chlorophenyl, 3,5-dichlorophenyl and 2,4-dibromophenyl.

Carboxamides represented by the above formula include

N-(1-azido-2,2,2-trichloroethyl)-2,4-dipropoxybenzamide,
N-(1-azido-2,2,2-tribromoethyl)-cyclohexanecarboxamide,
N-(1-azido-2,2,2-tribromoethyl)-formamide,
N-(1-azido-2-bromo-2,2-dichloroethyl)-thioformamide,
N-(1-azido-2,2,2-trichloroethyl)-3-chlorobutanamide,
N-(1-azido-2,2-dibromo-2-chloroethyl)-hexanamide,
N-(1-azido-2-bromo-2,2-dichloroethyl)-4,5-dichlorohexanamide,
N-(1-azido-2,2,2-trichloroethyl)-2-bromoacetamide,
N-(1-azido-2,2,2-trichloroethyl)-thiobenzamide,
N-(1-azido-2,2,2-tribromoethyl)-thioacetamide,
N-(1-azido-2-bromo-2,2-dichloroethyl)-3-bromothiopropionamide,
N-(1-azido-2,2,2-trichloroethyl)-thiocyclopropanecarboxamide,
N-(1-azido-2,2,2-trichloroethyl)-4-ethoxybenzamide,
N-(1-azido-2,2-dibromo-2-chloroethyl)-2-chloro-4-bromothiobenzamide,
N-(1-azido-2,2,2-trichloroethyl)-4-bromo-3-nitrobenzamide,
N-(1-azido-2,2,2-tribromoethyl)-furamide,
N-(1-azido-2,2,2-trichloroethyl-octanamide,
N-(1-azido-2,2,2-trichloroethyl)-decanamide,
N-(1-azido-2-bromo-2,2-dichloroethyl)-4-chlorocyclohexanecarboxamide,
N-(1-azido-2,2,2-trichloroethyl)-cinnamamide,
N-(1-azido-2,2,2-tribromoethyl)-4-bromocinnamamide,
N-(1-azido-2,2,2-trichloroethyl)-5-hexeneamide,
N-(1-azido-2,2-dibromo-2-chloroethyl)-5-chlorofuramide,
N-(1-azido-2,2,2-trichloroethyl)-2-phenylacetamide,
N-(1-azido-2,2,2-trichloroethyl)-3-(4-chlorophenyl)propionamide,
N-(1-azido-2,2,2-trichloroethyl)-2-(4-bromophenylsulfonyl)acetamide,
N-(1-azido-2,2-dibromo-2-chloroethyl)-5-nitrofuramide,
N-(1-azido-2-bromo-2,2-dichloroethyl)-3-(2,4-dichlorophenylsulfonyl)thiopropionamide,
N-(1-azido-2,2,2-trichloroethyl)-2-phenylthio-thioacetamide,
N-(1-azido-2,2-dibromo-2-chloroethyl)-3-(3,5-dichlorophenylthio)propionamide,
N-(1-azido-2,2,2-tribromoethyl)-4,-(6-bromo-2-chlorophenylthio)butanamide,
N-(1-azido-2,2,2-trichloroethyl)-4-(3-bromophenylsulfonyl)butanamide,
N-(1-azido-2,2,2-tribromoethyl)-4-phenylsulfonylthiobutanamide, and
N-(1-azodi-2,2-dibromo-2-chloroethyl)-3,5-diethoxythiobenzamide.

Sulfonamides represented by the above formula include

N-(1-azido-2,2,2-trichloroethyl)-4-bromobenzenesulfonamide,
N-(1-azido-2-bromo-2,2-dichloroethyl)-3,4-dichlorobenzenesulfonamide,
N-(1-azido-2,2,2-trichloroethyl)-3,5-dimethoxybenzenesulfonamide,
N-(1-azido-2,2,2-trichloroethyl)-3-nitrobenzenesulfonamide, and
N-(1-azido-2-bromo-2,2-dichloroethyl)-2-nitro-4-chlorobenzenesulfonamide,
N-(1-azido-2,2,2-trichloroethyl)-methanesulfonamide,
N-(1-azido-2,2,2-tribromoethyl)-ethanesulfonamide,
N-(1-azido-2,2,2-tribromoethyl)propenesulfonamide,
N-(1-azido-2-bromo-2,2-dichloroethyl)hexanesulfonamide,
N-(1-azido-2,2,2-trichloroethyl)-2,2-dichloroethanesulfonamide,
N-(1-azido-2,2,2-trichloroethyl)-bromobutenesulfonamide,
N-(1-azido-2,2-dibromo-2-chloroethyl)hexenesulfonamide,
N-(1-azido-2,2,2-trichloroethyl)cyclohexanesulfonamide,
N-(1-azido-2,2,2-tribromoethyl)cyclobutanesulfonamide,
N-(1-azido-2,2,2-trichloroethyl)-3,5-dibromocyclohexanesulfonamide,
N-(1-azido-2,2-dibromo-2-chloroethyl)-3-chlorocyclobutanesulfonamide,
N-(1-azido-2,2,2-trichloroethyl)-4-chlorobutanesulfonamide, and
N-(1-azido-2,2,2-trichloroethyl)-3-bromo-4-chloropentanesulfonamide.

Carbamates represented by the above formula include

N-(1-azido-2-bromo-2,2-dichloroethyl)-isopropylcarbamate,
N-(1-azido-2,2,2-trichloroethyl)-butylthiocarbamate,
N-(1-azido-2,2,2-trichloroethyl)-hexylcarbamate,
N-(1-azido-2,2,2-trichloroethyl)-methylthiocarbamate, and
N-(1-azido-2,2-dibromo-2-chloroethyl)ethylcarbamate.

The azides of this invention are prepared by reacting a corresponding N-(1,2,2,2-tetrahaloethyl) amide with an alkali metal azide. This reaction proceeds according to the following equation:

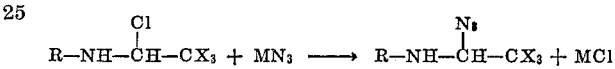

wherein R and X are as defined previously and M is an alkali metal such as sodium, potassium and lithium. This reaction will normally be carried out in polar, aprotic solvents such as acetonitrile, dimethoxyethane, tetrahydrofuran, dimethylformamide and dimethylsulfoxide. Normally the N - (1 - chloro - 2,2,2 - trihaloethyl)amide will be dissolved in the solvent to a concentration of about 5 and 20% by weight and the solid alkali metal azide will be added with agitation. The temperature of this reaction will usually be in the range of ambient temperature up to about 100° C. More usually it will be betwen about 20° C. and 60° C. Stoichiometric proportions of the reactants will normally be employed. The pressure used in the reaction is not critical. For convenience atmospheric or autogenous pressure may be used. The N-(1-azido-2,2,2-trihaloethyl) amide or carbamate product may be recovered from the reaction mixture by filtering out the alkali metal halide and stripping the solvent from the filtrate.

The organic starting materials for the above reaction may be prepared by the method of British Pat. No. 993,051. In this procedure an amide or a carbamate is condensed with a trihaloacetaldehyde. The resulting hydroxy compound is further reacted with thionyl chloride to replace this hydroxyl group with a chlorine atom. The reaction is as follows:

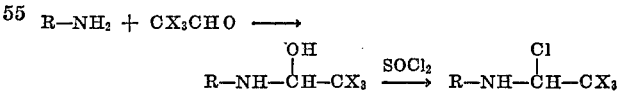

wherein R and X are as defined previously.

EXAMPLES

The following examples illustrate the azides of this invention and their preparation. Unless otherwise indicated, percentages are by weight.

Example 1

21.1 g. N-(1,2,2,2-tetrachloroethyl)formamide was dissolved in 100 ml. of acetonitrile. 6.5 g. of sodium azide was heated slowly at ambient temperature with stirring. The mixture was stirred overnight, after which the reaction mixture was filtered. The acetonitrile was removed from the filtrate leaving an orange liquid residue. This residue was cooled in an ice bath and the sides of the vessel containing the residue were scratched. After 30 minutes of this treatment, about 11 g. of N-(1-azido-2,2,2-trichloroethyl) formamide precipitated. This compound melted at 42–54° C. Its elemental analysis was: Calculated (percent): Cl, 48.97; N, 25.75. Found (percent): Cl, 48.05; N, 25.50.

Example 2

8.7 g. of N-(1,2,2,2-tetrachloroethyl)-4-chlorobenzenesulfonamide was dissolved in about 50 ml. acetonitrile. To this solution 1.58 g. of sodium azide was added with mixing. The combined mixture was stirred for one hour. Reaction mixture was then filtrated and the solid was washed with cold acetonitrile. The acetonitrile was evaporated from the filtrate leaving an oil residue. This residue solidified upon standing overnight, giving 9.0 g. N-(1-azido-2,2,2 - trichloroethyl)-4-chlorobenzenesulfonamide. This sulfonamide melted at 112–116° C. Its element analysis was: Calculated (percent): Cl, 39.0; S, 8.80. Found (percent): Cl, 37.82; S, 9.39.

Other azides of this invention were prepared using the general procedures described above. These azides are tabulated in Table I below.

UTILITY

The azides of this invention exhibit excellent biological activity against nematodes. The nematocidal activity of representative azides of this invention are illustrated by testing them according to the following method.

A 0.38 ml. portion of a 3% acetone solution of the test compound was diluted with 1 ml. acetone. The resulting solution was homogeneously mixed with 20 cc. of vermiculite. The treated vermiculite was then mixed homogeneously with 750 g. of soil, dry weight basis, which was severely infested with nematodes (mixed culture of Meloidogyne javanica and Meloidogyne incognita). This mixing gave a concentration of approximately 15 parts of the test compound per million parts of soil. This treated soil was stored for 4 days at 65–75° F. It was then divided equally into 3 parts, each of which was put into a separate pot and kept for another 3 days. A 3-week old tomato (v. Bonny Best) seedling was then transplanted into each pot and incubated for 13 days under greenhouse conditions. After this period they were removed and the soil was washed from their roots. The nematocidal effectiveness of the test compound was determined by observing each plant for signs of nematode invasion (number of galls formed, stunting, etc.).

The results of these tests, reported as the average of the 3 replicates on a 0 to 100 basis—0 indicating no effectiveness; 100 indicating complete effectiveness—are reported in Table II.

TABLE II

| Compound: | Nematocidal activity—percent |
|---|---|
| N-(1-azido - 2,2,2 - trichloroethyl) - 3,5 - dimethoxybenzamide | 100 |
| N-(1-azido - 2,2,2 - trichloroethyl)-3,4,5-trimethoxybenzamide | 100 |
| N-(1-azido-2,2,2-trichloroethyl)-pivalamide | 100 |
| N-(1 - azido-2,2,2-trichloroethyl)-cyclopropanecarboxamide | 100 |
| N-(1-azido - 2,2,2 - trichloroethyl)-2,2-dichloropropionamide | 100 |
| N-(1-azido - 2,2,2 - trichloroethyl)-2-phenylsulfenylacetamide | 35 |
| N-(1-azido-2,2,2-trichloroethyl)-acrylamide | 100 |
| N-(1-azido-2,2,2-trichloroethyl)-furamide | 100 |
| N-(1-azido - 2,2,2 - trichloroethyl)-3-chloropropionamide | 99 |
| N-(1-azido - 2,2,2 - trichloroethyl)-3,4-dichlorobenzamide | 93 |
| N-(1 - azido - 2,2,2 - trichloroethyl)-4-chloro-3-nitrobenzamide | 95 |
| N-(1-azido - 2,2,2 - trichloroethyl)-2,4-dichlorobenzamide | 97 |
| N-(1 - azido-2,2,2-trichloroethyl)-2-chlorobenzamide | 95 |
| N-(1-azido - 2,2,2 - trichloroethyl)-2-(4-chlorophenylsulfonyl) acetamide | 100 |
| N-(1-azido - 2,2,2 - trichloroethyl)-2-phenylsulfonylacetamide | 100 |
| N-(1 - azido - 2,2,2 - trichloroethyl)-2-chloro-5-nitrobenzamide | 93 |
| N-(1 - azido-2,2,2-trichloroethyl)-dichloroacetamide | 100 |
| N-(1 - azido-2,2,2-trichloroethyl)-2-chloroacetamide | 100 |
| N-(1-azido - 2,2,2 - trichloroethyl)-2-(4-chlorophenylthio)-acetamide | 96 |
| N-(1-azido - 2,2,2 - trichloroethyl)-isopropylcarbamate | 100 |
| N-(1-azido - 2,2,2 - trichloroethyl)-4-chlorobenzenesulfonamide | 100 |

TABLE I

| Compound | Melting point, °C. | Calculated Cl | Calculated S | Calculated N | Calculated C | Found Cl | Found S | Found N | Found C |
|---|---|---|---|---|---|---|---|---|---|
| N-(1-azido-2,2,2-trichloroethyl)-3,5-dimethoxybenzamide | 93–99 | 30.06 | | | | 30.35 | | | |
| N-(1-azido-2,2,2-trichloroethyl)-3,4,5-trimethoxybenzamide | 125–127 | 27.8 | | | | 27.65 | | | |
| N-(1-azido-2,2,2-trichloroethyl)-pivalamide | 53–57 | 38.8 | | | | 38.80 | | | |
| N-(1-azido-2,2,2-trichloroethyl)-cyclopropanecarboxamide | 127–127 | 41.4 | | | | 40.75 | | | |
| N-(1-azido-2,2,2-trichloroethyl)-2,2-dichloropropionamide | 37–38 | 56.4 | | 17.80 | | 52.35 | | 16.70 | |
| N-(1-azido-2,2,2-trichloroethyl)-2-phenylsulfenylacetamide | 87–89 | 31.4 | | | | 31.45 | | | |
| N-(1-azido-2,2,2-trichloroethyl)-acrylamide | 54–57 | 41.4 | | | | 41.20 | | | |
| N-(1-azido-2,2,2-trichloroethyl)-furamide | 94–98 | 37.6 | | | | 37.15 | | | |
| N-(1-azido-2,2,2-trichloroethyl)-3-chloropropionamide | 78–89 | 50.7 | | | | 49.05 | | | |
| N-(1-azido-2,2,2-trichloroethyl)-3,4-dichlorobenzamide | 127–129 | 49.0 | | | | 47.60 | | | |
| N-(1-azido-2,2,2-trichloroethyl)-4-chloro-3-nitrobenzamide | 135–127 | 38.05 | | | | 36.85 | | | |
| N-(1-azido-2,2,2-trichloroethyl)-2,4-dichlorobenzamide | 81–83 | 49.0 | | | | 48.15 | | | |
| N-(1-azido-2,2,2-trichloroethyl)-2-chlorobenzamide | 110–116 | 43.3 | | | | 42.30 | | | |
| N-(1-azido-2,2,2-trichloroethyl)-2-(4-chlorophenylsulfonyl) acetamide | 120–123 | 35.0 | 7.88 | | | 33.95 | 8.10 | | |
| N-(1-azido-2,2,2-trichloroethyl)-2-phenylsulfonylacetamide | Liquid | 28.63 | 8.62 | | | 28.95 | 8.62 | | |
| N-(1-azido-2,2,2-trichloroethyl)-dichloroacetamide | 108–110 | 59.1 | | | | 58.10 | | | |
| N-(1-azido-2,2,2-trichloroethyl)-2-chloroacetamide | 71.5–72.5 | 53.4 | | 21.05 | 18.02 | 52.36 | | 21.00 | 17.90 |
| N-(1-azido-2,2,2-trichloroethyl)-2-(4-chlorophenylthio) acetamide | 74–76 | 37.98 | 8.58 | | | 37.85 | 8.55 | | |
| N-(1-azido-2,2,2-trichloroethyl)-isopropylcarbamate | 46.5–48.5 | 38.65 | | 20.34 | | 36.95 | | 17.75 | |

As illustrated above, the azides of this invention may be used to control plant-parasitic nematodes by exposing them to a toxic amount of the azide. Thus, these azides will normally be applied to nematode-infested soil at dosages in the range of 3 to 40 lbs. per acre. They may be applied as liquid formulations by spraying or injection. They may also be applied as solid formulations containing carriers such as soil, sawdust, clay and the like. When used as a solid, these azides will usually be plowed into the soil to facilitate their contact with the nematodes. Following their application to the soil, the soil will be watered to disperse the azide below ground level.

The above-mentioned liquid formulations will comprise one or more azides admixed with a suitable solvent or diluent. Such formulations may be solutions, dispersions or emulsions. These liquid compositions will also usually contain a surfactant to facilitate the azide's penetration into the soil and generally enhance its effectiveness.

Nematocidal formulations of these azides may also contain stabilizers, spreading agents, fillers, other compatible pesticides and the like.

I claim:

1. A method for controlling nematodes which comprises exposing said nematodes to a nematocidally effective amount of a compound of the formula

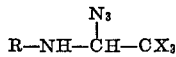

wherein X is halogen of atomic number 17 to 35 and R is

wherein Z is a chalcogen atom of atomic number 8 to 16 and R' is hydrogen; nonarylhydrocarbyl of 1 to 10 carbon atoms from the group consisting of alkyl, alkenyl, cycloalkyl and cycloalkenyl; nonarylhalohydrocarbyl from the group consisting of alkyl, alkenyl, cycloalkyl and cycloalkenyl and of 1 to 10 carbon atoms and 1 to 3 halogen atoms of atomic number 17 to 35; monocarbocyclicaryl of 6 to 15 carbon atoms, the benzene nucleus of said monocarbocyclicaryl radical being substituted with 0 to 3 alkoxy groups of 1 to 3 carbon atoms each, halogens of atomic number 17 to 35 or nitro groups; alkoxy of 1 to 6 carbon atoms; phenylthioalkyl in which the alkyl is of 1 to 3 carbon atoms and the phenyl is substituted with 0 to 2 halogen atoms of atomic number 17 to 35; or phenylsulfonylalkyl in which the alkyl is of 1 to 3 carbon atoms and the phenyl is substituted with 0 to 2 halogen atoms of atomic number 17 to 35.

2. The method of claim 1 wherein X is chlorine and Z is oxygen.

3. The method of claim 1 wherein R' is hydrogen; alkyl of 1 to 6 carbon atoms; monoalkenyl of 2 to 5 carbon atoms; cycloalkyl of 3 to 6 carbon atoms, monocarbocyclic aryl of 6 to 10 carbon atoms in which the benzene nucleus is substituted with 0 to 3 chlorine atoms, nitro groups or alkoxy groups of 1 to 2 carbon atoms each; chloroalkyl of 1 to 6 carbon atoms and 1 to 3 chlorine atoms; alkoxy of 1 to 3 carbon atoms; phenylthiomethyl in which the phenyl group is substituted with 0 to 3 chlorine atoms; or phenylsulfonylmethyl wherein the phenyl group is substituted with 0 to 3 chlorine atoms.

4. The method of claim 1 wherein R' is hydrogen, 4-chlorophenyl, 3,5 - dimethoxyphenyl, 3,4,5 - trimethoxyphenyl, t-butyl, cyclopropyl, 2,2-dichloroethyl, phenylthiomethyl, vinyl, 2-chloroethyl, 3,4-dichlorophenyl, 4-chloro-3-nitrophenyl, 2-chlorophenyl, 4-chlorophenylsulfonylmethyl, phenylsulfonylmethyl, 2-chloro-5-nitrophenyl, dichloromethyl, chloromethyl, 4-chlorophenylthiomethyl or isopropoxy.

5. The method of claim 1 wherein Z is oxygen, X is chlorine and R' is hydrogen.

6. The method of claim 4 wherein Z is oxygen and X is chlorine.

7. A nematocidal composition comprising a solid carrier or solvent and a nematocidally effective amount of a compound of the formula

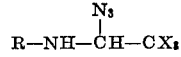

wherein X is halogen of atomic number 17 to 35 and R is

wherein Z is a chalcogen atom of atomic number 8 to 16 and R' is hydrogen; nonarylhydrocarbyl of 1 to 10 carbon atoms from the group consisting of alkyl, alkenyl, cycloalkyl and cycloalkenyl; nonarylhalohydrocarbyl from the group consisting of alkyl, alkenyl, cycloalkyl and cycloalkenyl and of 1 to 10 carbon atoms and 1 to 3 halogen atoms of atomic number 17 to 35; monocarbocyclicaryl of 6 to 15 carbon atoms, the benzene nucleus of said monocarbocyclicaryl radical being substituted with 0 to 3 alkoxy groups of 1 to 3 carbon atoms each, halogens of atomic number 17 to 35 or nitro groups; alkoxy of 1 to 6 carbon atoms; phenylthioalkyl in which the alkyl is of 1 to 3 carbon atoms and the phenyl is substituted with 0 to 2 halogen atoms of atomic number 17 to 35; or phenylsulfonylalkyl in which the alkyl is of 1 to 3 carbon atoms and the phenyl is substituted with 0 to 2 halogen atoms of atomic number 17 to 35.

8. The composition of claim 7 wherein X is chlorine and Z is oxygen.

9. The composition of claim 7 wherein R' is hydrogen, 4-chlorophenyl, 3,5-dimethoxyphenyl, 3,4,5-trimethoxyphenyl, t-butyl, cyclopropyl, 2,2-dichloroethyl, phenylthiomethyl, vinyl, 2-chloroethyl, 3,4-dichlorophenyl, 4-chloro-3-nitrophenyl, 2-chlorophenyl, 4-chlorophenylsulfonylmethyl, phenylsulfonylmethyl, 2-chloro-5-nitrophenyl, dichloromethyl, chloromethyl, 4-chlorophenylthiomethyl or isopropoxy.

10. The composition of claim 7 wherein R' is hydrogen, X is chlorine and Z is oxygen.

References Cited

Weygand et al.: Chemische Berichte, vol. 99, pp. 1944, 1945 and 1955 (1966).

ALBERT T. MEYERS, Primary Examiner

L. SCHENKMAN, Assistant Examiner